United States Patent

Gueldenpfennig et al.

[15] 3,679,835

[45] July 25, 1972

[54] CAMP-ON BUSY CHECKING AND MONITOR CIRCUIT

[72] Inventors: Klaus Gueldenpfennig, Penfield; Uwe A. Pommerening; Stanley L. Russell, both of Webster, all of N.Y.

[73] Assignee: Stromberg-Carlson Corporation, Rochester, N.Y.

[22] Filed: March 5, 1971

[21] Appl. No.: 121,432

[52] U.S. Cl. ....................179/27 FD
[51] Int. Cl. ....................H04m 3/42
[58] Field of Search ....................179/18 BG, 27 FD

[56] References Cited

UNITED STATES PATENTS 3,381,095 4/1968 Baker et al....................179/27 FD

*Primary Examiner*—William C. Cooper
*Attorney*—Craig, Antonelli, Stewart & Hill

[57] ABSTRACT

Camp-on busy checking and monitor circuit which permits only a single line to camp-on a given line at one time and limits the total number of camp-on connections by applying a tone to the loops which are associated with the connection desiring to be camped on and monitoring all of the other loops to see if the tone returns in one of those loops.

10 Claims, 3 Drawing Figures

INVENTORS
KLAUS GUELDENPFENNIG
UWE A. POMMERENING
STANLEY L. RUSSELL

BY Craig, Antonelli, Stewart & Hill

ATTORNEYS

CAMP-ON BUSY CHECKING AND MONITOR CIRCUIT

The present invention relates in general to automatic telephone systems, and more particularly to a circuit for controlling the establishment of camp-on connections in a private automatic branch exchange.

As is well known, with the camp-on feature, the operation is able to connect an incoming trunk circuit to a line which is already busy on another call so that the second subscriber is literally camped on the busy line circuit until that line circuit becomes free and available for connection to the camped on subscriber. Such a feature eliminates the necessity for the calling subscriber to make repeated attempts to establish the communication connection which would greatly increase the incoming traffic to the exchange and inconvenience the subscriber and also permits the operator to handle other calls while the calling subscriber is camped on the busy line circuit.

In spite of the advantageous aspects of the camp-on feature, there are certain disadvantages associated with this feature which require special control. First of all, a calling subscriber which is camped on to a busy line circuit occupies a trunk which remains unavailable for other use during the entire period of the camp-on connection. If the camp-on feature is not utilized to any great extent in the system, relatively few trunks will be tied up by this feature; however, for systems which are subjected to heavy traffic, a very large number of trunks might be tied up with the camp-on feature, thereby unduly limiting the capability of the system to handle incoming calls. Accordingly, it is desirable to provide control circuitry within the system to limit the number of simultaneous camp-on connections which may be established to a value which will not unduly tie up the number of trunks available in the system.

A second problem which may arise as a result of a camp-on connection results from the camping on of two subscribers on a single line circuit. If a trunk is already camped on a busy line circuit and the operator camps a second trunk on the same line circuit, the system will not be able to determine which of the camped-on trunks to connect to the line circuit once it becomes free, unless rather complicated monitoring circuitry is provided to determine the order in which the camped on trunks are to be serviced. In addition, while a calling party may be willing to wait for a busy line circuit to become free if he is able to connect to that line circuit at the time that it becomes free, most subscribers are unwilling to wait for a line circuit to become free when they are the second party waiting for connection to that line circuit. Thus, it is of advantage to provide in a telephone system having the camp-on feature available some monitoring means to determine whether a trunk is already camped on to a busy line circuit so that a second camp on the same busy line circuit can be avoided.

There is at least one known camp-on system which provides a check of the number of camp-on connections within the system so as to limit the number of such connections and also monitors the camp-on connections to insure that no more than one party is camped on a single line circuit at one time. However, this system is rather complicated in that the monitoring portion includes a memory which stores the designations of the lines associated with a camp-on connection so that a comparison can be made when it is desired to camp-on a line to insure that the line is not already in a camped-on condition.

In accordance with the present invention a camp-on system is provided which avoids the need for a memory and other complicated control circuitry. This is accomplished by the application of a tone signal outside of the voice frequency band to the loops which is associated with the connection desiring to be camped on and monitoring all of the other loops to see if the tone returns in one of those loops. A trunk which desires to camp-on a line is first connected to the line so that if another trunk is already camped on the same line, the two trunks will be connected to one another. Thus, a tone applied to the trunk which desires to camp on will return through the trunk which is already camped on the line.

In this way, it is unnecessary to remember which trunks are camped on which line circuits by means of complicated and expensive circuitry. A simple tone generator selectively connected to the loops and a detector in the loops provide all of the information necessary to determine whether the camp-on connection can be permitted.

In accordance with the present invention, it is also possible to reverse the above-described detection process. As will be obvious from this description, the tone generated by the tone generator may be selectively applied to all loop circuits but the one associated with the trunk desiring to camp-on and a detector in the latter loop can determine whether a camp-on connection is already associated with the called line circuit by detecting return of the tone.

It is therefore an object of the present invention to provide a camp-on checking and monitor circuit which is capable of determining whether a trunk is already camped on to a particular line circuit and the total number of line circuits having a trunk camped thereon in a very simple manner.

It is another object of the present invention to provide a camp-on checking and monitor circuit of the type described which is capable of association with substantially any type of automatic telephone exchange.

It is a further object of the present invention to provide a camp-on busy checking and monitor circuit which is simple in configuration, dependable in use and economic to manufacture.

These and other objects, features and advantages of the present invention will become more clear from the following detailed description of the present invention, when taken in conjunction with the accompanying drawings, which illustrate one exemplary embodiment of the present invention, and wherein.

The exemplary embodiment of the present invention is described in connection with a private automatic branch exchange (PABX) having a plurality of operator positions which are enabled within the system on a time-division basis; however, it should be understood that the present invention may be associated with other types of telephone systems than the one specifically described herein.

Figure 1:
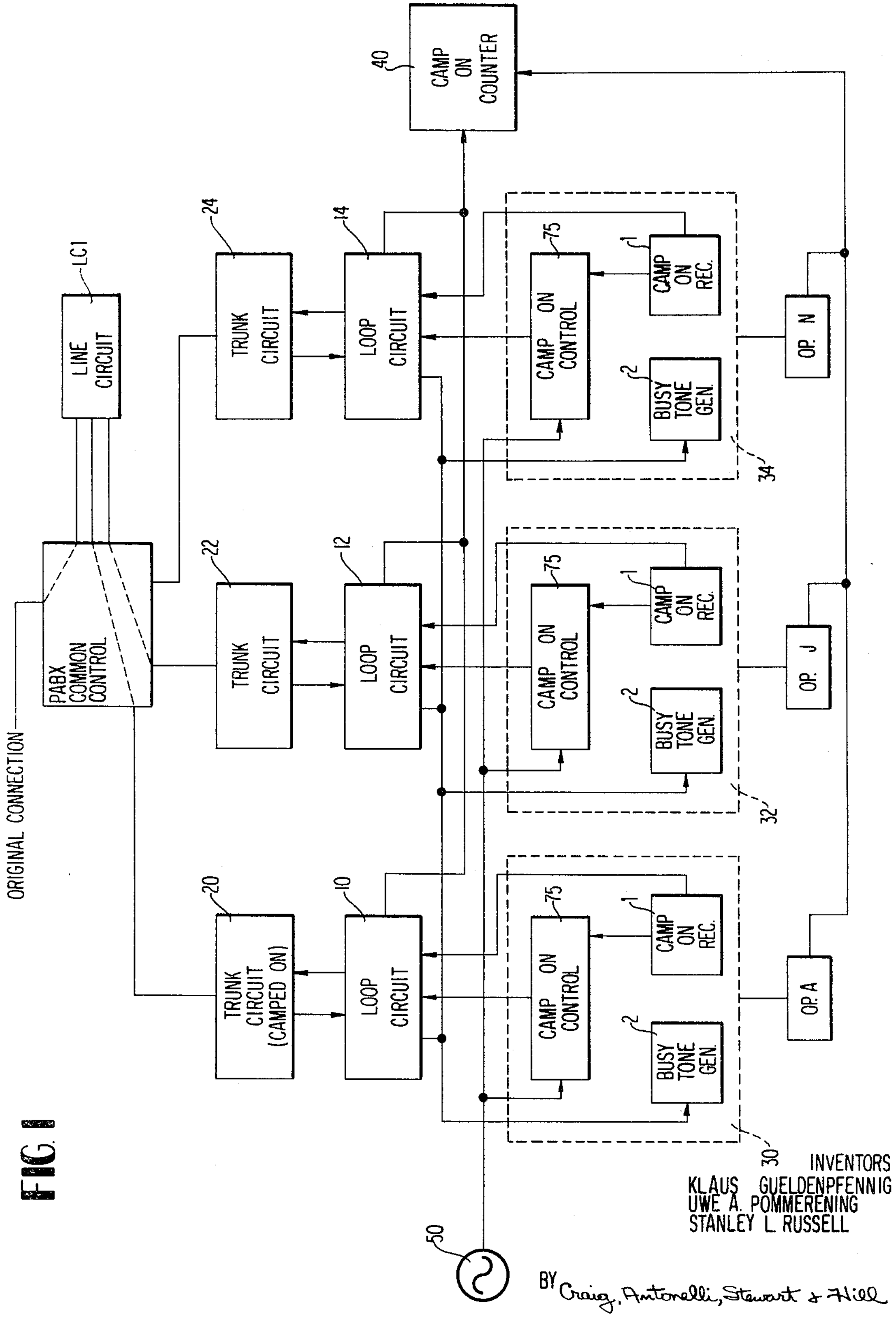
FIG. 1 is a basic block diagram of the camp-on checking and monitor circuit of the present invention.

As is well known, the camp-on feature relates to the situation where an incoming trunk call connected to the operator or attendant seeks connection to a line circuit which is already busy with another call. The busy condition of the called line circuit is indicated by the system to the attendant when an attempt is made to switch the incoming trunk via a loop circuit to the called line circuit. At that time, the attendant asks the calling subscriber whether he wishes to camp on the busy line, and if so, initiates the camp-on feature by pressing a button or other device at the attendent's console. The conventional camp-on circuit within the system will then connect the trunk and the associated loop circuit to the busy line circuit in a camp-on condition. FIG. 1 is a schematic block diagram of the camp-on busy checking and monitor circuit of the present invention which determines (1) whether a trunk is already camped on the same line circuit which the calling subscriber wishes to camp on, and (2) whether a maximum number of camp-on connections have already been established within the system. The actual circuitry for establishing the camp-on connection in response to a request from the operator or attendant does not form part of the present invention and may therefore be provided in the form of any conventional camp-on circuit. Thus, the camp-on circuitry which establishes the camp-on connection has not been specifically described herein.

The PABX system with which the invention is associated may, for example, have N operator positions, of which positions A, J and N are illustrated in FIG. 1. Each of these operator positions 30, 32 and 34 is connected to a respective operator console and includes, for purposes of the present invention, a camp-on receiver 1, a busy tone generator 2 and a camp-on control 75. The respective operator positions may be connected through loop circuits 10, 12 or 14 and trunk circuits 20, 22 and 24, respectively, to the PABX 100 under control of the attendent for purposes of camping on a selected one of a plurality of line circuits, such as line circuit LC1. The system also includes a tone generator 50 providing an output signal having a frequency outside of the voice band, which tone signal may be selectively connected to the loop circuits by the operator under control of the camp-on control 75.

In FIG. 1, the trunk 20 is illustrated as camped-on to the line circuit LC1 through the PABX 100. The line circuit LC1 is shown as already busy with an original connection, which may be an incoming trunk call or an originating connection within the system. The trunk circuit 24 is also camped on to a line circuit, but not to the line circuit LC1; therefore, no connection exists between the trunk 24 and the line circuit LC1 through the PABX 100. For purposes of describing the present invention, it is assumed that the operator is attempting to establish a camp-on connection from the trunk 22 to the line circuit LC1.

When the operator attempts to connect the trunk 22 to the line circuit LC1, a busy indication will be received from the busy monitor circuit (not shown) in the PABX 100. If the calling subscriber wishes to camp on the busy line circuit, the operator will depress a button at the operator console J so as to signal the camp-on receiver 1 in the operator position circuit 32, which will generate a camp-on check signal. The camp-on check signal is applied to the camp-on control 75 and to a detector in the loop circuit 12 to enable the detector and provide for connection of the tone generator 50 through the camp-on control 75 to the loop circuit 12. It should be noted at this point that the tone generator 50 is connected to the loop circuit 12, but is not connected to the other loop circuits. The tone generated by the generator 50, which is outside of the voice frequency band, will extend through the loop circuit 12 and the trunk circuit 22 connected thereto to the line circuit LC1 connected to the trunk.

Since the trunk 20 is already camped on the line circuit LC1, it will be connected in parallel with the trunk 22 and therefore the tone from the trunk 22 will return through the trunk 20 and loop circuit 10 and will be detected by the detector in that loop circuit. Upon detecting the tone, a camp-on deny signal is generated by the detector in loop circuit 10 inhibiting the camp-on connection of the trunk 22 to the line circuit LC1. The operator will recognize the inability to camp on the particular line circuit by actuating the busy tone generator 2 in the operator position circuit 32, who will then inform the subscriber that camp-on is not possible. Once the subscriber releases from this connection, the connection of the trunk 22 to the line circuit LC1 will automatically release.

As seen in FIG. 1, the trunk circuit 24 is also camped on to a line circuit (not shown), but it will not receive the tone from the generator 50 at the time a camp-on is attempted in connection with trunk circuit 22, since the trunk circuit 24 is not connected to the line circuit LC1. Thus, if the trunk 20 had not been camped on the line circuit LC1, and no other trunk was camped on that line circuit, the tone applied from the generator 50 through the trunk 22 would not return through any of the loop circuits to be detected by the detector therein. In such case, camp-on to the line circuit LC1 would be possible and would be automatically effected by the system due to absence of the generation of a camp-on deny signal.

A camp-on counter 40 is connected to all of the loop circuits and is responsive to actuation from one of the operator consoles for scanning the loop circuits and counting the number of camp-on connections which have been set up in the system. If the number of camp-on connections established reaches a maximum, further attempts to camp-on will be inhibited until a further connection is available.

Figure 2:
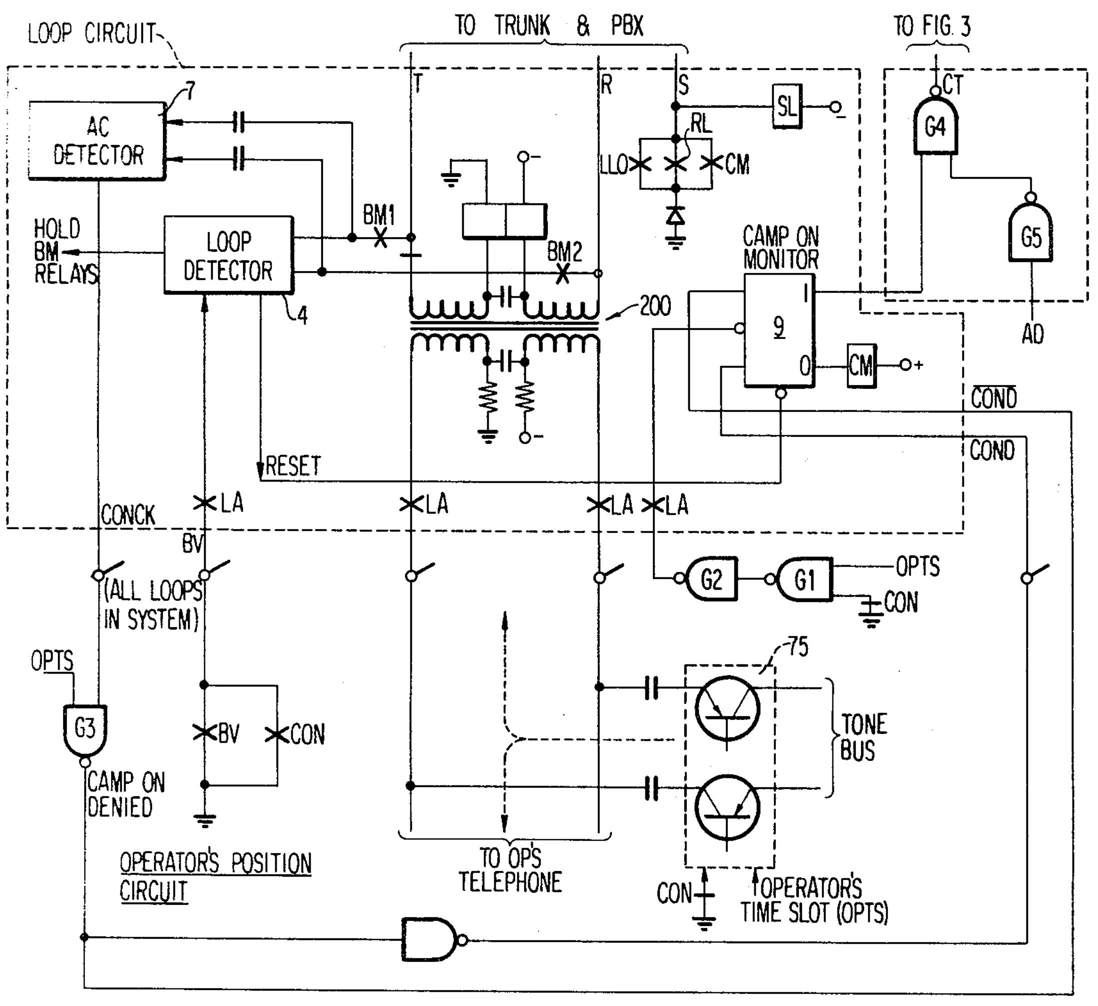
FIG. 2 is a schematic circuit diagram of the circuitry provided at the operator position.
Figure 3:
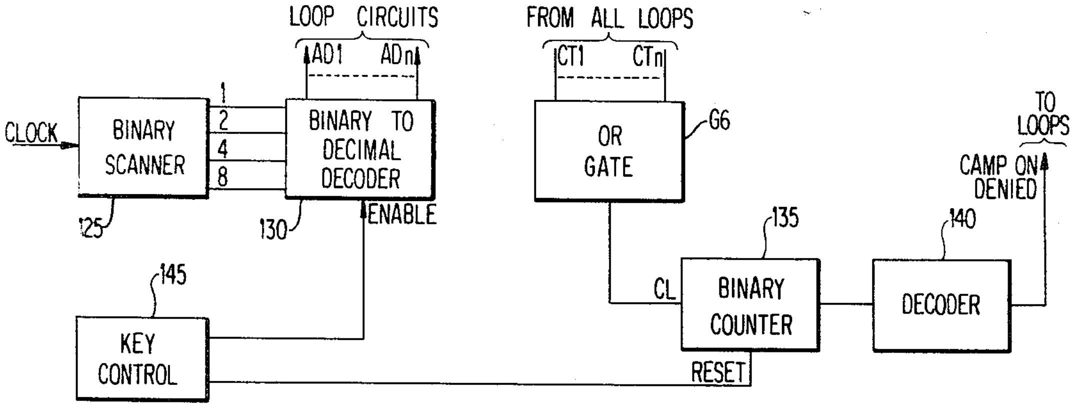
FIG. 3 is a schematic circuit diagram of the camp-on counter.

FIGS. 2 and 3 illustrate in greater detail the circuitry of the present invention. Each loop circuit includes a transmission bridge 200 providing a DC loop to the tip T and ring R leads to the trunk circuit and a DC loop to the operator's console through the operator's position circuit. A sleeve lead S also extends with the tip T and ring R leads through the trunk circuit to the PABX for establishing a connection to a line circuit. The DC loop connected to the tip T and ring R leads to the trunk circuit may be selectively connected through contacts of a busy monitor relay BM (not shown) to a loop detector 4 which determines the busy-free condition of the line circuit to which the loop is connected and also provides a parallel connection of the transmission pair to the tone detector 7, which detects the high frequency tone received from the loop indicating that the line circuit already has a trunk camped thereon.

The camp-on control 75 is illustrated in FIG. 2 as providing a switching arrangement for connecting the tone bus from the tone generator 50 to the transmission bridge when camp-on is requested by the operator associated with that position circuit. Thus, for the single operator position which is attempting to establish the camp-on connection, the high frequency tone will be applied through the camp-on control 75 to the transmission bridge 200 in the loop circuit and to the trunk connected thereto. If the tone returns through any other loop circuit, this tone will be detected by the detector 7 which will generate a camp-on check signal applied to the gate G3 in all operator position circuits. The gate G3 will be enabled by the operator time slot of the particular operator position involved in setting up the camp-on connection and the output of this gate will be applied to the inputs of a flip-flop 9 serving as a camp-on monitor. The camp-on monitor in a particular loop circuit is enabled via gates G1 and G2 by receipt of the operator time slot for the particular operator position associated with that line circuit simultaneously with a camp-on request, so that if a camp-on deny signal is generated at the output of gate G3, the camp-on monitor will be prevented from being set, thereby preventing the CM relay from being set, which also prevents the trunk associated with the operator's position from being permanently connected to the line circuit.

If after tone is applied to the loop circuit associated with the trunk attempting the camp-on connection and no tone is received in any of the other loop circuits, a camp-on deny signal will not be generated at the output of gate G2 applied to the camp-on monitor will set this flip-flop, thereby actuating the CM relay. With actuation of the CM relay, ground will be connected to the sleeve lead S to the trunk circuit, thereby holding the connection of the trunk circuit to the line circuit in a camp-on connection. At the same time, the loop detector 4 will monitor the condition of the line circuit and when the line circuit is no longer busy, a reset signal will be applied to the camp-on monitor resetting the flip-flop and thereby making the loop circuit available for establishing another camp-on connection.

The set output of the camp-on monitor also provides an indication that the trunk associated with the loop circuit is in the camp-on condition. Thus, in order to determine the number of trunks which are camped-on to line circuits in the system, it is necessary only to determine the number of loop circuits having a camp-on monitor which is in the set condition. The camp-on counter circuit 40 illustrated in FIG. 3 performs this function.

A binary counter 25 advances in response to the receipt of clock pulses so as to provide a successive binary count to a binary-to-decimal decoder 130. The decoder 130 provides a plurality of output leads AD1–AD*n* to each of the loop circuits, respectively, these leads being applied through a gate G5 to one input of an AND gate G4 connected to the set output of the camp-on monitor in the loop circuit. The gate G4 in each of the loop circuits in connected to a respective input of an OR gate combination G6 which provides a counting pulse CL to the input of a binary counter 135 as each loop circuit monitoring a camp-on condition is scanned. Connected to the output of the binary counter 135 is a decoder 140 which provides an output when the count from the counter 135 reaches a predetermined value representing the maximum number of camp-on connections which may be permitted within the system. When this number is reached by the counter 135, as detected by the decoder 140, a camp-on deny signal is generated in the decoder 140 preventing further camp-on connections within the system.

The decoder 130 and counter 135 are connected to the control keys in the operator consoles, so that depression of the camp-on key by the operator will enable the decoder 130 and reset the counter 135. Thus, each time an operator attempts to set up a camp-on connection by depressing the key 145, a new scan of the loops and count of the loops associated with a camp-on connection will be initiated.

It should be apparent from the foregoing description that the present invention provides extremely simple means for determining whether a camp-on connection is already associated with a particular line circuit so as to prevent a further camp-on connection to be associated with that line circuit. No special memory circuits or registers are needed to retain equipment numbers associated with line circuits having camp-on connections thereto. The provision of a simple tone generator for selective connection to the loop circuits of the system provides an immediate indication as to whether a trunk is already camped on to a particular line circuit and simple means is provided for monitoring the loop circuits to determine when a preselected maximum number of camp-on connections has been established within the system.

While we have shown and described one embodiment in accordance with the present invention, it is understood that the same is not limited thereto but is susceptible of numerous changes and modifications as known to a person skilled in the art and we therefore do not wish to be limited to the details shown and described herein but intend to cover all such changes and modifications as are obvious to one of ordinary skill in the art.

We claim:

1. In an automatic private branch exchange including a plurality of trunk circuits, a plurality of line circuits, a plurality of loop circuits, common control means for connecting selected trunks to selected line circuits, and a plurality of operator stations connectable to said trunks through a loop circuit and capable of establishing a camp-on connection of a trunk to a busy line circuit, a camp-on monitor and control circuit comprising a tone generator providing a distinctive tone signal, camp-on control means for selectively applying said distinctive tone signal through at least one trunk circuit to a selected line circuit to which a camp-on connection is to be made, and detector means responsive to detection of said distinctive tone signal at the output of at least one trunk circuit other than the one through which said tone signal is connected by said camp-on control means for generating a camp-on deny signal.

2. A system as defined in claim 1, wherein said camp-on control means connects said tone generator to the trunk circuit which is to be camped-on said selected line circuit and said detector means monitors the outputs of all of the other trunks.

3. A system as defined in claim 2, wherein a detector means is provided in each loop circuit and each detector means includes a camp-on monitor indicating whether the loop circuit is connected to a trunk which is in the camp-on condition, and further including camp-on counter means responsive to the camp-on monitors in said loop circuits for generating a camp-on deny signal in response to a camp-on request after a maximum number of camp-on connections have been established.

4. A system as defined in claim 3, wherein said camp-on counter means includes scanning means responsive to an operator function for sequentially scanning said camp-on monitors and a counter responsive to inputs from those camp-on monitors indicating a camp-on connection for generating a camp-on deny signal upon reaching a predetermined count.

5. A system as defined in claim 4, wherein each loop circuit includes a loop detector responsive to the busy/free condition of a line circuit to which the trunk circuit connected to the loop circuit is camped-on for resetting said camp-on monitor in the loop circuit when said line circuit becomes free.

6. A system as defined in claim 1, wherein said camp-on control means connects said tone generator to all of said trunk circuits except the trunk circuit which is to be camped on said selected line circuit and said detector means monitors only the output of said trunk circuit not receiving said tone signal from said generator.

7. A system as defined in claim 6, wherein a detector means is provided in each loop circuit and each detector means includes a camp-on monitor indicating whether the loop circuit is connected to a trunk which is in the camp-on condition, and further including camp-on counter means responsive to the camp-on monitors in said loop circuits for generating a camp-on deny signal in response to a camp-on request after a maximum number of camp-on connections have been established.

8. A system as defined in claim 7, wherein said camp-on counter means includes scanning means responsive to an operator function for sequentially scanning said camp-on monitors and a counter responsive to inputs from those camp-on monitors indicating a camp-on connection for generating a camp-on deny signal upon reaching a predetermined count.

9. A system as defined in claim 8, wherein each loop circuit includes a loop detector responsive to the busy/free condition of a line circuit to which the trunk circuit connected to the loop circuit is camped-on for resetting said camp-on monitor in the loop circuit when said line circuit becomes free.

10. A system as defined in claim 1, wherein said tone generator generates a tone having a frequency outside of the voice band.

* * * * *